United States Patent [19]

Gephardt et al.

[11] Patent Number: 5,060,138
[45] Date of Patent: Oct. 22, 1991

[54] APPARATUS FOR USE WITH A COMPUTING DEVICE FOR GENERATING A SUBSTITUTE ACKNOWLEDGEMENT TO AN INPUT WHEN THE COMPUTING DEVICE IS IN AN OPERATIONAL HIATUS

[75] Inventors: Douglas D. Gephardt, Austin; Peggy Avalos, Georgetown, both of Tex.

[73] Assignee: Advanced Micro Devices, Inc., Sunnyvale, Calif.

[21] Appl. No.: 576,695

[22] Filed: Aug. 31, 1990

[51] Int. Cl.⁵ .................. G06F 15/16; G06F 11/16
[52] U.S. Cl. ............................. 364/200; 364/240.9; 364/268.9
[58] Field of Search ............... 364/200, 900; 371/7, 371/8.1, 9.1, 11.3

[56] References Cited

U.S. PATENT DOCUMENTS

| | | | |
|---|---|---|---|
| 4,575,826 | 3/1986 | Dean | 364/200 |
| 4,590,554 | 5/1986 | Glazer et al. | 364/200 |
| 4,698,748 | 10/1987 | Juzswik et al. | 364/200 |
| 4,965,714 | 10/1990 | Knecht | 371/8.1 |

Primary Examiner—Allen R. MacDonald
Assistant Examiner—Robert S. Hauser
Attorney, Agent, or Firm—Foley & Lardner

[57] ABSTRACT

The invention is an apparatus for use with a computing device for generating a substitute acknowledgement to a first input signal when the computing device is in an operational hiatus. The apparatus comprises a logical processing circuit for indicating presence of the first input signal depending upon the state of a second input signal, and a logical circuit for producing an output signal which is representative of a selection of one of the plurality of logical inputs. The selection of logical inputs is determined by the state of the second input signal. The first input signal is a hold request signal and comprises a first logical input to the logical processing circuit. A second logical input is a hold acknowledgement signal which is generated by the computing device in response to the presence of the first input signal when the computing device is not in an operational hiatus.

5 Claims, 2 Drawing Sheets

APPARATUS FOR USE WITH A COMPUTING DEVICE FOR GENERATING A SUBSTITUTE ACKNOWLEDGEMENT TO AN INPUT WHEN THE COMPUTING DEVICE IS IN AN OPERATIONAL HIATUS

CROSS REFERENCE TO RELATED APPLICATIONS

The following applications contain subject matter similar to the subject matter of this application.

(TT0091) U.S. patent application Ser. No. 07/576,012, filed Aug. 31, 1990; entitled "Integrated Digital Processing Apparatus";

(TT0092) U.S. patent application Ser. No. 07/576,601, filed Aug. 31, 1990; entitled "System for Effecting Communications Between a Computing Device and a Plurality of Peripheral Devices";

(TT0093) U.S. patent application Ser. No. 07/576,017, filed Aug. 31, 1990; entitled "Apparatus for Use with a Computing Device Controlling Communications with a Plurality of Peripheral Devices";

(TT0097) U.S. patent application Ser. No. 07/576,019, filed Aug. 31, 1990; entitled "System for Controlling Communications Among a Computer Processing Unit and a Plurality of Peripheral Devices"; and (TT0098) U.S. patent application Ser. No. 07/5676,061, filed Aug. 31, 1990; entitled "Apparatus for Controlling Access to a Data Bus".

BACKGROUND OF THE INVENTION

The present invention is directed to an apparatus for use with a computing device for generating a substitute acknowledgement to a first input signal when the computing device is in an operational hiatus. Specifically, the present invention is directed to an apparatus for generating an artificial hold acknowledge signal in response to a hold request signal on behalf of a computer processing unit when the computer processing unit is disabled or otherwise in an operational hiatus.

Generally, a hold acknowledge signal is required in response to a hold request signal before a computer processing unit will yield access to a data bus. If a computer processing unit is in an operational hiatus, such as responding to a disable signal, or experiencing a clock stoppage, or the like, then the computer processing unit cannot generate a hold acknowledge signal. Despite the fact that the computer processing unit cannot operate and, therefore, has no reason to maintain control of access to a data bus, the fact that no hold acknowledge signal can be issued by the computer processing unit in response to a hold request signal nevertheless precludes access to the data bus by another device.

Accordingly, it is important that there be a means for freeing access to a data bus by generating an artificial hold acknowledge signal during periods of operational hiatus by the computer processing unit. In such manner, monopolization of access to the data bus by a quiescent computer processing unit by default may be precluded.

Such a capability to allow access to a data bus during periods during which a computer processing unit is in operational hiatus is of particular importance where certain functions of the computer system must continue during such quiescent periods. For example, it is a common practice to save power by halting clock signals to a device which is normally clocked, thereby precluding repeated strobing to check status according to a clock signal when such repeated checking of status is not necessary. That is, to conserve power a device may be rendered quiescent. However, such devices often require refreshing of memory devices, especially dynamic random access memory (DRAM) devices, and certain other functions must continue despite the stoppage of clocking signals to the computer processing unit.

The present invention provides an apparatus for accommodating such continued operational requirements during times when a computer processing unit is quiescent.

SUMMARY OF THE INVENTION

The invention is an apparatus for use with a computing device for generating a substitute acknowledgement to a first input signal when the computing device is in an operational hiatus. The apparatus comprises a logical processing circuit for indicating presence of the first input signal depending upon the state of a second input signal, and a logical circuit for producing an output signal which is representative of a selection of one of the plurality of logical inputs. The selection of logical inputs is determined by the state of the second input signal. The first input signal is a hold request signal and comprises a first logical input to the logical processing circuit. A second logical input is a hold acknowledgement signal which is generated by the computing device in response to the presence of the first input signal when the computing device is not in an operational hiatus.

It is, therefore, an object of the present invention to provide an apparatus for use with a computing system for generating a substitute acknowledgement to a first input signal when the computing device is in an operational hiatus in order to facilitate continuous performance of specified functions of a computing system regardless of the operational status of a computer processing unit associated with the computing system.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
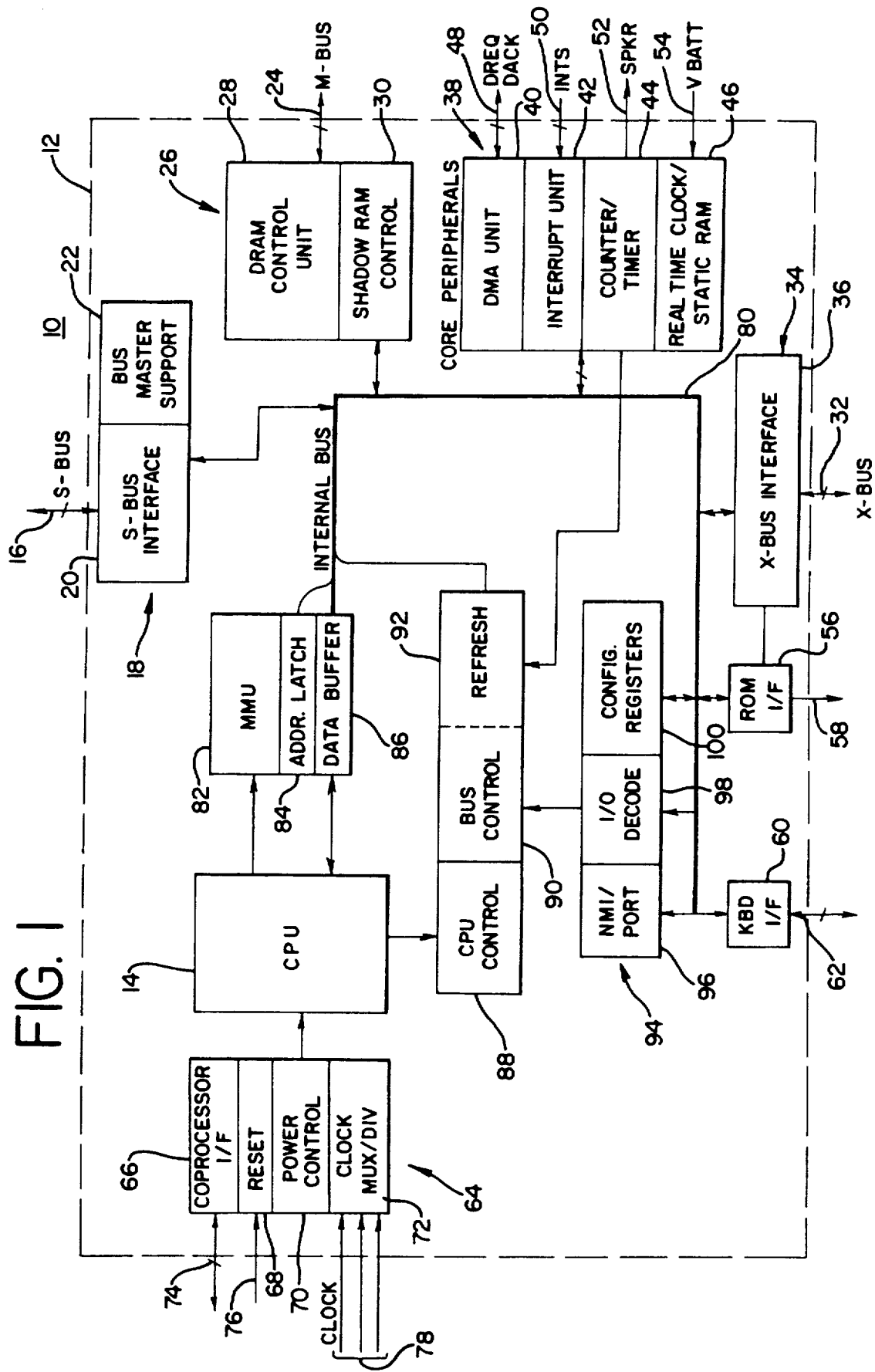
FIG. 1 is a system-level schematic diagram of a computing system utilizing the present invention.

FIG. 1 is a system-level schematic diagram of a computing system utilizing the present invention. In FIG. 1, an apparatus 10 is illustrated as situated on a single substrate 12. Apparatus 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to apparatus 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for apparatus 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

Apparatus 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to apparatus 10 X-bus connection 32, the preferred embodiment of apparatus 10 illustrated in FIG. 1 also provides for direct ROM connection to a ROM interface 56 through an input-output pins 58. Similarly, a keyboard interface 60 is also provided for access to apparatus 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of apparatus 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which is responsive to counter/timer 44 to periodically refresh specified components of apparatus 10, such as dynamic RAMs (DRAMs) through DRAM control unit 28.

Internal supportive peripheral devices 94 are situated intermediate internal bus 80 and bus control circuit 90, including a non-maskable interrupt (NMI) control port 96, an input-output decode circuit 98, and configurable registers 100.

Thus, apparatus 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to apparatus 10 with no additional supportive peripheral devices required. Effective and efficient internal communications within apparatus 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, apparatus 10 is configured on a single substrate 12 as an integrated digital circuit, thereby providing the advantages of higher operating speed, lower power consumption, and reduced occupancy of "real estate" in its physical embodiment.

In order to facilitate understanding of the present invention, like elements will be indicated by like reference numerals in the various drawings.

Figure 2:
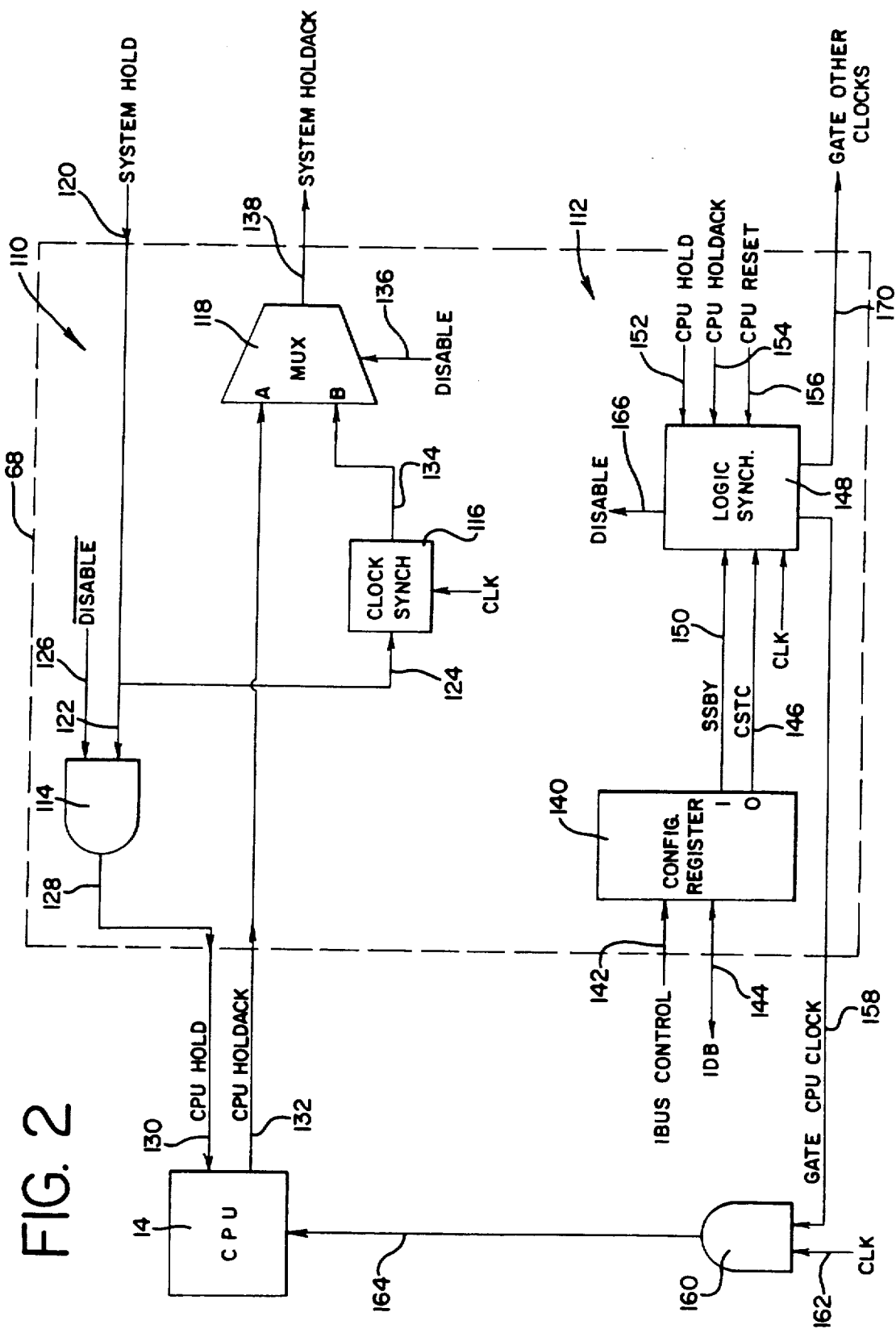
FIG. 2 is a schematic diagram of the preferred embodiment of the present invention.

FIG. 2 is a schematic diagram of the preferred embodiment of the present invention. In FIG. 2, a reset circuit 68 (see also FIG. 1) is illustrated including an artificial hold acknowledge apparatus 110 and a logic synchronizing apparatus 112.

Artificial hold acknowledge apparatus 110 preferably comprises an AND gate 114, a clock synchronization circuit 116, and a multiplexer 118. Artificial hold acknowledge apparatus 110 receives a system hold request signal at input 120 which is applied to an input 122 of AND gate 114, as well as to an input 124 of clock synchronization circuit 116. A second input 126 of AND gate 114 receives a NOT DISABLE signal which indicates that CPU clocks are on (i.e., that computer processing unit 14 is not in an operational hiatus). AND gate 114 produces a CPU hold signal at output 128 which is, in turn, applied to input 130 of computer processing unit 14. When computer processing unit 14 is operational (i.e., receiving a clock signal and not subject to any other condition imposing an operational hiatus), and when computer processing unit 14 is at a juncture in its execution of programs allowing it to cede control of access to a data bus (such as internal bus 80 in FIG. 1) then computer processing unit 14 will generate a CPU hold acknowledge signal at output 132. The CPU hold acknowledge signal is applied as input A to multiplexer 118.

Clock synchronization circuit 116 provides a clock-synchronized system hold request signal at output 134 which is applied to input B of multiplexer 118. Also applied at an input 136 of multiplexer 118 is a DISABLE signal, the inverse of the NOT DISABLE signal applied at input 126 of AND gate 114.

Multiplexer 118 provides at its output 138 the system hold acknowledge signal produced by artificial hold acknowledge apparatus 110. The system hold acknowledge signal at output 138 comprises the CPU hold acknowledge signal received at input A of multiplexer 118 when the DISABLE signal at input 136 is "0" (i.e., when the signal applied at input 136 is NOT DISABLED). Thus, the CPU hold acknowledge signal generated by computer processing unit 14 is produced as the system hold acknowledge signal at output 138 of artificial hold acknowledge apparatus 110 when the CPU clocks are on and when no DISABLE signal is applied at input 136 of multiplexer 118 or at input 126 of AND gate 114. If, however, a DISABLE signal is transmitted, that is if the CPU clocks are stopped, then input 126 of AND gate 114 receives a DISABLE signal, thereby interrupting the output of CPU hold signal at output 128 of AND gate 114, and the clocked system hold request signal applied at input B of multiplexer 118 is selected by multiplexer 118 (because the DISABLE signal at input 136 now equals "1"). Thus, when a DISABLE signal is applied at inputs 126, 136, the system hold acknowledge signal produced at output 138 of artificial hold acknowledge apparatus 110 is the clock-synchronized system hold request signal. In such manner, when computer processing unit 14 is in an operational hiatus, a hold acknowledge signal is produced at output 138 of multiplexer 118, thereby enabling bus control device 90 to allow access to internal bus 80 by another apparatus than computer processing unit 14.

Logic synchronizing apparatus 112 responds according to the setting of appropriate bits within configuration register 140. Signals changing bits may be received either from computer processing unit 14 via internal bus 80 at input 142 and input 144. When the appropriate bit is set, a CPU clock stop (CSTC) signal is applied via line 146 to logic synchronization circuit 148, and when the appropriate bit is set at 1, a system standby (SSBY) signal is applied to logic synchronization circuit 148 via line 150. Other signals received by logic synchronization circuit 148 include CPU hold signal at input 152, CPU hold acknowledge signal at input 154, and CPU reset signal at input 156.

According to predetermined logic residing in logic synchronization circuit 148, depending upon the status of the various inputs 146, 150, 152, 154, 156, the clock signal to computer processing unit 14 may be gated by a gate CPU clock signal on line 158 to AND gate 160 to allow the clock signal applied at input 162 of AND gate 160 to pass as an input 164 to computer processing unit 14. Similarly, a DISABLE signal may be produced by logic synchronization circuit 148 as an output 166, to be received as previously described in its respective proper forms at input 136 of multiplexer 118 and at input 126 of AND gate 114. A gating signal to other clocks in an associated computer system may be transmitted on line 170.

By way of example, referring to FIG. 1, certain functions must be continued even during periods when computer processing unit 14 is not receiving a clock signal, i.e., when computer processing unit 14 is in an operational hiatus. Therefore, refresh generator 92 and counter/timer device 44 are always required to run in order to effect refreshing of dynamic random access memory units (DRAMs) through DRAM control unit 28. DRAM control unit 28 has a refresh section which always runs. Also, real time clock and static RAM device 46 are required to always run to maintain system time and date. Such "always run" units are preferably clocked independently of logic synchronizing apparatus 112.

Certain other aspects of apparatus 10 illustrated in FIG. 1 are preferably temporarily stopped when it is decided to place computer processing unit 14 in a standby (SSBY) mode. Thus, for example, bus control device 90, CPU control device 88, and computer processing unit 14 would not be clocked in a system standby mode.

Still other configurations may be desirable during an operational hiatus by computer processing unit 14, that is when the CPU clocks are stopped. Thus, by way of example, computer processing unit 14 is stopped (does not receive clock signals) during a CPU stop clock mode when configuration register 140 has appropriate bits set. However, CPU control device 88 and bus control device 90 continue to run in such a CPU stop clock mode in order, for example, to utilize artificial hold acknowledge apparatus 110 to enable bus control device 90 to enable other devices to have access to internal bus 80. Certainly, as described earlier, refresh generator 92 and its associated refresh circuitry: counter/timer device 44, real time clock and static RAM device 46, and DRAM control unit 28 continue operating during the CPU stop clock mode.

Such selective enablement may be effected, for example, by logic synchronization circuit 148 by selectively gating clocks via signals on line 170.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. An apparatus for use with a computing device for generating a substitute acknowledgement to a first input when said computing device is in an operational hiatus; the apparatus comprising:

a logical processing means for indicating presence of said first input depending upon the state of a second input, said first input being indicated as present by a status signal when said second input is in a first state, and said first input being not indicated as present by said status signal when said second input is in a second state; and a logical means for producing an output signal, said output signal being representative of a selection of one of a plurality of signal inputs, said selection being determined by said state of said second input, said logical processing means and said logical means being operatively connected with said computing device;

a first of said plurality of signal inputs being said first input, and a second of said plurality of signal inputs being an acknowledgement signal, said acknowledgement signal being generated by said computing device in response to said status signal indicating presence of said first input.

2. An apparatus for use with a computing device as recited in claim 1 wherein said second input is in said second state when said computing device is in said operational hiatus.

3. An apparatus for use with a computing device as recited in claim 1 wherein said first input is a bus access request signal and said second signal is a processor hold signal.

4. An apparatus for use with a computing device as recited in claim 2 wherein said first input is a bus access request signal and said second signal is a processor hold signal.

5. An apparatus for use with a computer system, said computer system including a computer processing unit, a plurality of peripheral devices, an internal bus operatively connected with said computer processing unit and said plurality of peripheral devices for effecting communications among said computer processing unit and said plurality of peripheral devices, and a bus controller operatively connected with said internal bus for controlling access to said internal bus, said bus controller conveying a processor hold signal to said computer processing unit when access to said internal bus is to be allowed to one of said plurality of peripheral devices, said access requiring receipt of a hold acknowledgement signal by said bus controller; the apparatus comprising:

a logical processing means for indicating presence of said processor hold signal depending upon the state of a system disabling signal, said processor hold signal being indicated as present by a status signal when said system disabling signal is in a first state, and said processor hold signal being not indicated as present by said status signal when said system disabling signal is in a second state; and a multiplexing means for producing a multiplexed output signal, said output signal being representative of a selection of signals present at one of two input pins, said selection being dependent upon said state of said system disabling signal, said logical processing means and said multiplexing means being operatively connected with said computer processing unit and operatively connected with said bus controller;

said computer processing unit generating a hold response signal in response to said status signal indicating presence of said processor hold signal;

said multiplexing means being operatively connected to receive said hold response signal from said computer processing unit at a first of said two input pins, said multiplexing means being operatively configured and connected to receive said processor hold signal at a second of said two input pins;

said multiplexed output signal being said hold acknowledgement signal, said multiplexed output signal being said hold response signal when said system disabling signal is not in an appropriate state to disable said computer processing unit, and said multiplexed output signal being said processor hold signal when said system disabling signal is in an appropriate state to disable said computer processing unit.

* * * * *